United States Patent [19]

Gustafsson

[11] 4,042,931
[45] Aug. 16, 1977

[54] TRACKING SYSTEM FOR MULTIPLE BEAM ANTENNA

[75] Inventor: Sven G. Gustafsson, Billdal, Sweden

[73] Assignee: Raytheon Company, Lexington, Mass.

[21] Appl. No.: 687,051

[22] Filed: May 17, 1976

[51] Int. Cl.² .............................................. G01S 5/02
[52] U.S. Cl. ............................ 343/117 R; 343/113 R
[58] Field of Search ........................ 343/117 A, 113 R

[56] References Cited

U.S. PATENT DOCUMENTS

| 3,176,297 | 3/1965 | Forsberg | 343/117 A |
| 3,967,279 | 6/1976 | Zeger | 343/117 A |

Primary Examiner—Maynard R. Wilbur
Assistant Examiner—T. M. Blum

Attorney, Agent, or Firm—David M. Warren; Joseph D. Pannone; Milton D. Bartlett

[57] ABSTRACT

A tracking system for use with an antenna having a multiple beam radiation pattern for sensing the direction of radiant energy incident upon the antenna. Pairs of the beams are selectively coupled to a monopulse comparator comprising a pair of hybrid couplers interconnected by a fixed phase shifter providing 90° phase shift and by a pair of variable phase shifters providing phase shifts of equal magnitude but opposite sign. The output of the second hybrid coupler provides monopulse sum and difference signals. A sensing circuit responsive to the sum and difference signals operates the variable phase shifters to steer a null between the selected pair of beams.

8 Claims, 5 Drawing Figures

TRACKING SYSTEM FOR MULTIPLE BEAM ANTENNA

BACKGROUND OF THE INVENTION

Antennas having a radiation pattern in the form of several fixed diverging beams are often used in tracking a moving source of radiant energy, as in telemetry applications, wherein it is desired to communicate with a moving vehicle carrying the source as well as to determine the direction of the vehicle and source relative to the antenna. Electrical circuitry of the prior art coupled to such an antenna senses the relative magnitudes of signal strength in a plurality of the beams to sense the direction of the source.

A problem arises in that, while accurate sensing of the source direction is obtainable when the source is oriented along the axis between adjacent beams, the capability for sensing the source direction is continuously diminished as the source moves off axis towards one of the beams of the aforementioned pair of beams. This is in accordance with the well-known decreasing slope of the angle error graph for sources of radiation oriented away from the null between two receiving beams in a monopulse radar.

A further problem arises in the communication along the telemetry link to the vehicle, particularly with communication employing a phase modulation of the carrier of the radiation transmitted from the vehicle to the antenna. This problem arises because the signal processing of electrical circuitry which senses the relative magnitudes of the signals of the beams may introduce phase modulations in addition to those communicated from the vehicle, these additional phase modulations degrading the quality of the received signal.

SUMMARY OF THE INVENTION

The aforementioned problems are overcome and other advantages are provided by a tracking system coupled to a multiple beam antenna which, in accordance with the invention, comprises a variable monopulse comparator having a pair of hybrid couplers interconnected by a fixed phase shifter providing 90° phase shift and by a pair of variable phase shifters. In a preferred embodiment of the invention, each hybrid coupler is a three dB (decibels) 90° hybrid coupler. The two variable phase shifters provide phase shifts of equal amplitude but of opposite sign which prevent the appearance of phase modulation, due to changes in phase by the phase shifters, in the output sum and difference channels of the comparator. This permits the accurate reception of phase modulated communications along a telemetry link between the antenna and a source of radiant energy carried by a moving vehicle.

The phase shifts introduced by the fixed and variable phase shifters provide a difference signal at the output of the comparator in accordance with the well-known form of the monopulse angle error graph which represents the deviation of the direction of a source of radiant energy from the axis of an antenna radiation pattern. In the case of a multiple beam antenna, there are several such axes depending on the pair of beams selected for viewing the source of radiant energy. In accordance with the invention, the aforementioned error graph is shifted in position according to the magnitude of the phase shift imparted by the variable phase shifters, this shifting of position altering the direction of a selected pair of receiving beams of the multiple beam antenna such that an axis between the two beams in the pair of beams is directed towards the source of radiant energy. As a result, the maximum sensitivity at the null point of the error graph is retained for all values of the angle of orientation of the source relative to the antenna and its radiation pattern. There is also disclosed a switch for selectively coupling other pairs of beams of the antenna radiation pattern when the phase shifters impart a maximum amount of phase shift.

BRIEF DESCRIPTION OF THE DRAWINGS

The aforementioned aspects and other features of the invention are explained in the following description taken in connection with accompanying drawings wherein.

DESCRIPTION OF THE PREFERRED EMBODIMENT

Figure 1:
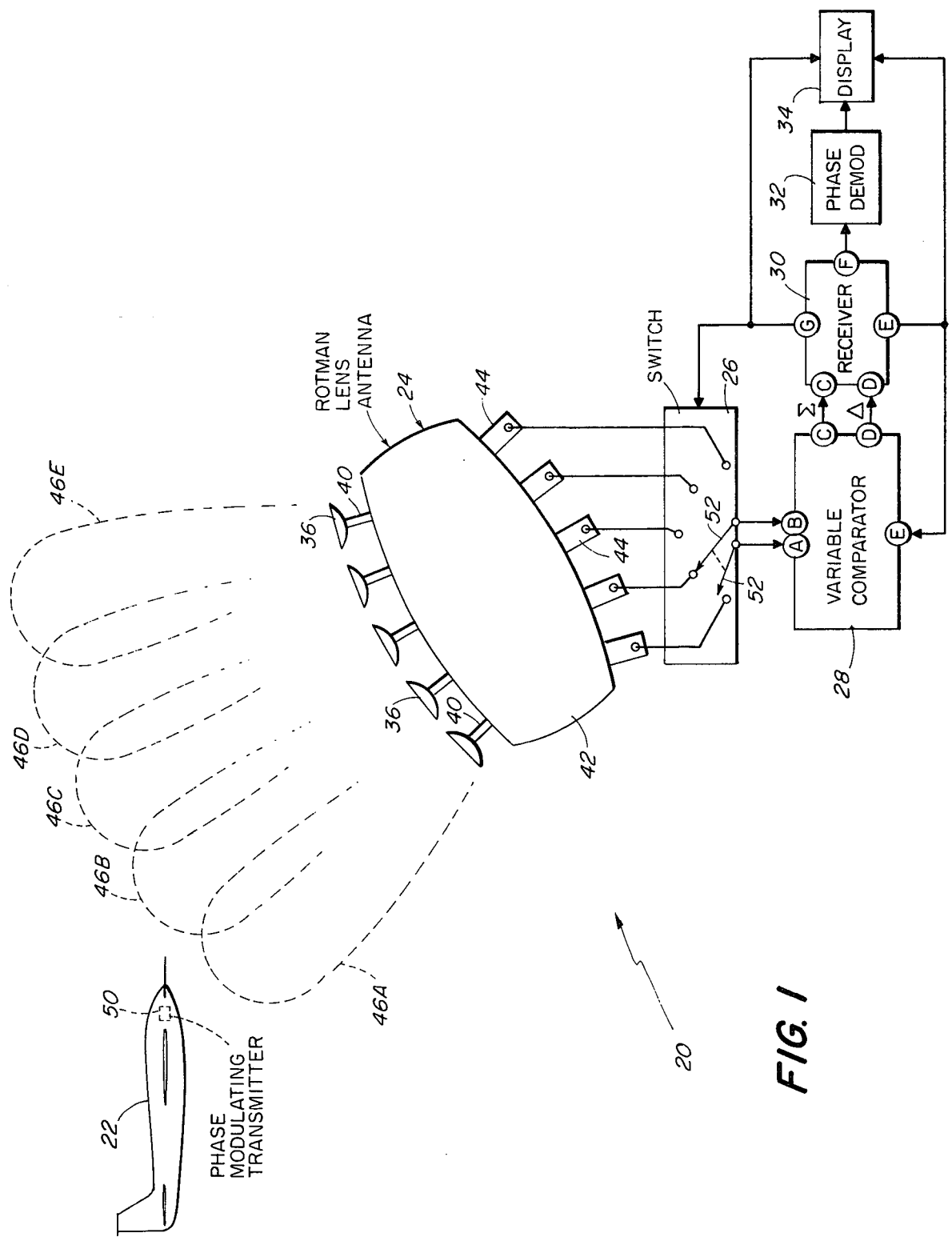
FIG. 1 is a stylized diagrammatic view of a telemetry link in which a source of radiant energy carried by a moving vehicle transmits radiation towards a multiple beam antenna, the figure also showing a variable comparator of the invention switchably connected to the antenna.

Referring now to FIG. 1, there is seen a system 20 for tracking an airplane 22 and for receiving messages transmitted therefrom, the system 20 comprising, in accordance with the invention, a multiple beam antenna 24, a switch 26, a comparator 28, a receiver 30, a demodulator 32 and a display 34. The structure of the antenna 24 is disclosed in U.S. Pat. No. 3,170,158 which issued in the name of Rotman on Feb. 16, 1965. The antenna 24 comprises a set of radiating elements 36 coupled by probes 40 to one side of a chamber 42 and a set of horns 44 connected to the opposite side of the chamber 42. The antenna 24 is sometimes referred to as a Rotman lens because of its ability to focus a beam of radiant energy such as the beam 46B which is incident upon the radiating elements 36, to focus at the location of one of the horns 44. The beams will be referred to hereinafter generally by the numeral 46 with the suffixes A-E being used to identify specific ones of the beams 46.

The airplane 22 carries a transmitter 50 which transmits radiant energy signals towards the antenna 24, the transmitter 50 including a phase modulator to modulate the phase of a carrier of the radiant energy for imparting thereto data to be transmitted from the airplane 22. The location of the airplane 22 relative to the antenna 24 is obtained by noting which of the beams 46 are receiving radiant energy transmitted from the aiplane 22. The determination of the position of the airplane 22 by means of signals obtained from the horns 44 of the antenna 24 is accomplished in a manner to be disclosed hereinafter wherein the null of a monopulse error tracking graph of a pair of the beams 46 can be shifted relative to the positions of the other ones of beams 46, this shifting being accomplished in a manner which preserves the phase modulation introduced by the transmitter 50 of the airplane 22.

The shifting of the null of the monopulse error graph is accomplished by the comparator 28 in response to signals provided at its terminal E by the receiver 30. The comparator 28 is coupled via its terminals A and B to two arms 52 of the switch 26 for receiving signals from two adjacent horns 44 of the antenna 24. The comparator 28 combines the signals at its terminals A and B in the manner of a radar monopulse comparator to provide sum and difference signals respectively at terminals C and D. The comparator 28 is a variable comparator in the sense that the relationship of the sum and difference signal is not only a function of the position of the airplane 22 relative to a pair of the beams 46 but is also dependent on the magnitude of the signal at terminal E. In essence, the signal at terminal E thereby steers the null of the monopulse error graph to follow the position of the airplane 22. When the position of the airplane 22 has reached the limits of the comparator 28 for varying the position of the null, the receiver 30 transmits a signal via its terminal G to the switch 26 to select another pair of the beams 46A-E. In addition, the receiver 30 provides a signal at terminal F having the same phase as the sum signal at terminal C, the signal at terminal F being applied to the demodulator 32 which demodulates the phase modulation of the signal transmitted from the airplane 22 for displaying data from the airplane 22, either audibly or visually, upon the display 34. In addition, the signals from terminals E and G are also applied to the display 34 for displaying the position of the airplane 22 relative to the antenna 24.

Figure 2:
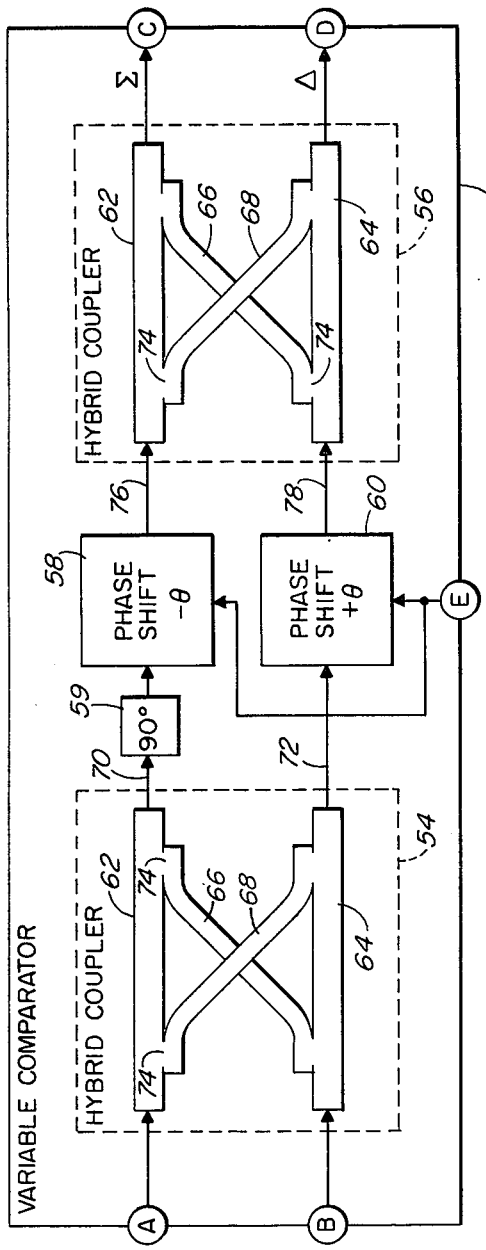
FIG. 2 is a diagram of the variable comparator of FIG. 1.

Referring now to FIG. 2, the comparator 28 is seen to comprise two hybrid couplers 54 and 56 and three phase shifters 58, 59 and 60. Each of the hybrid couplers 54 and 56 comprise four waveguide sections of which two sections are side arms 62 and 64 and two other sections are in the form of crossarms 66 and 68. Each hybrid coupler 54 and 56 is a 3 dB, 90°, coupler in that a signal at terminal A propagates through the side arm 62 and through the crossarm 68 to appear at both output ports of the coupler 54, respectively, on lines 70 and 72. The crossarms 66 and 68 are coupled via slots to the side arms 62 and 64, this coupling providing that half of the power from the signal at terminal A appears on line 70 with the other half appearing on line 72 under conditions where the phase shifters 59 and 60 present matched load impedances. A signal propagating from terminal A along crossarm 68 to line 72 experiences a phase lag of 90°. Similarly, a signal propagating along the crossarm 66 experiences a 90° phase lag between terminal B and line 70.

Each of the phase shifters 58 and 60 introduces a phase shift which is variable, while the phase shifter 59 introduces a fixed phase shift of 90°. In one embodiment of the invention the phase shifters 58 and 60 are digital phase shifters responsive to a digital signal at terminal E in which a three-digit signal orders eight possible values of phase shift in increments of 13° providing shifts from 0° to 91°. The phase shifter 58 is responsive to the compliment of the signal at terminal E and introduces negative increments in phase in response to the signal at terminal E while the phase shifter 60 introduces positive increments in phase in response to the signal at terminal E. For example, if the signal at terminal E orders 0° of phase shift, the phase shifter 60 provides 0° phase shift while the phase shifter 58 provides 91° phase shift. If the signal at terminal E orders a value of 13°, the phase shifter 60 increments its phase by 13° to produce 13° phase shift while the phase shifter 58 decrements its phase by 13° to produce 78° phase shift. The output of the phase shifter 58 is coupled via line 76 to the side arm 62 of the hybrid coupler 56 while the output of the phase shifter 60 is coupled via line 78 to the lower side arm 64 of the coupler 56. The total phase shift introduced by the phase shifters 58 and 59 between the couplers 54 and 56 varies from 181° to 90° while the phase shift introduced by the phase shifter 60 varies from 0° to 91°.

Figure 3:
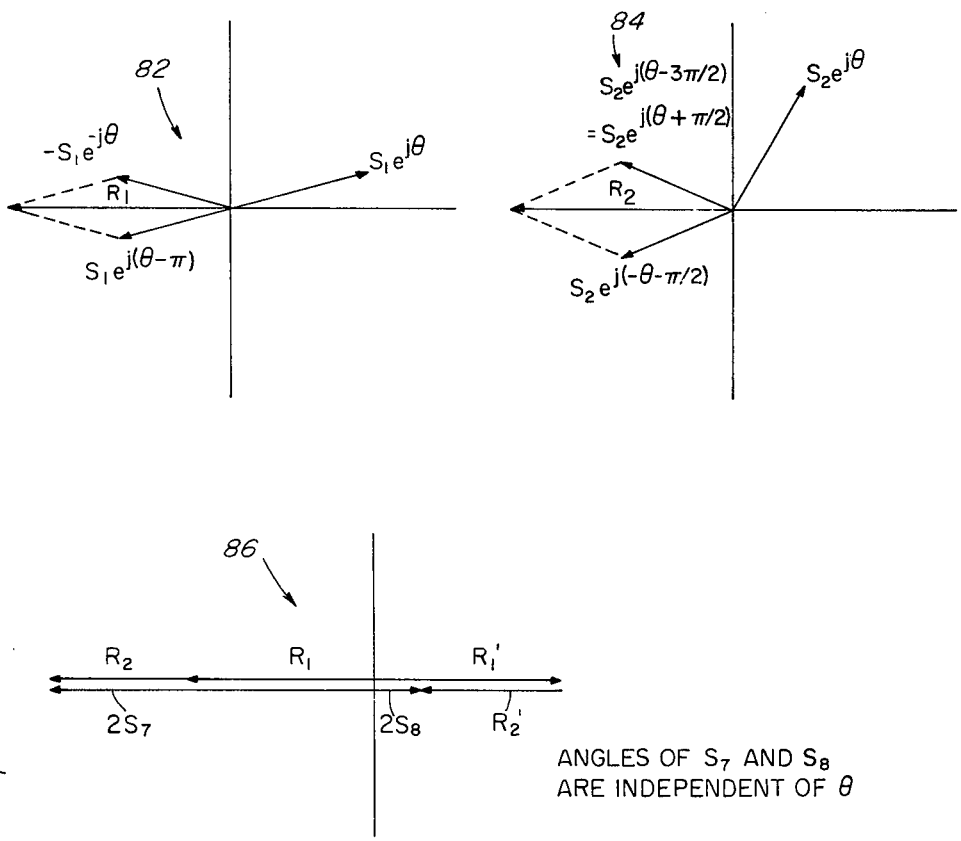
FIG. 3 provides a mathematical explanation including vectorial diagrams of the operation of the variable comparator of FIG. 2.

Referring now to FIGS. 2 and 3, a mathematical explanation of the operation of the variable comparator 28 is presented. In the diagram 80 of FIG. 3, the terminals A and B are represented by the symbols S1 and S2, the terminals C and D are represented by the symbols S7 and S8, and the lines 70, 72, 76 and 78 are represented respectively by the symbols S3, S4, S5 and S6. The hybrid couplers 54 and 56 are shown schematically. The phase shifters 58 and 59 are shown together as introducing a phase shift $\alpha$, and the phase sifter 60 is shown as introducing a phase shift $\beta$. Mathematical expressions for the values of S7 and S8 are given directly beneath the graph 80, these values being a function of S1, S2, $\alpha$ and $\beta$. Vector representations of the complex numbers in the expressions for S7 and S8 are presented in terms of R1 and R2 where R1 represents the first term within the brackets and R2 represents the second term within the brackets of the expression for S7. Similarly, the primed symbols, R1 and R2, represent the corresponding portions in the expression for S8. R1 and R2 are shown pictorially in the graphs respectively 82 and 84 for the condition where $\alpha$ and $\beta$ both include variable phase angles of equal magnitude but of opposite sign, the magnitude of the variable phase angle being represented by the angle $\theta$. The aforementioned relationship between the phase shifts introduced by the phase shifters 58 and 59 with the phase shifter 60, namely, the former decreasing from approximately 180° towards 90° while the latter increases from 0° to 90°, is expressed in FIG. 3 by making the magnitude of $\alpha$ equal to $\pi - \theta$. A vectorial representation of S7 and S8 is presented in graph 86. In particular, it is noted that S7, the value of the sum channel, is proportional to the sum of S1 and S2, while S8, the value of the difference channel, is proportional to the difference of S1 and S2.

A feature of the invention is seen in graph 86 wherein the angle of S7, as well as the angle of S8, is independent of the magnitude of $\theta$. Thus, it is seen that by providing the pair of phase shifters 58 and 60 with each providing phase shifts of equal magnitude but of opposite sign, a variable comparator can be constructed without introducing phase shift at the output ports, namely, terminals C and D of the comparator 28. Thus, the phase modulation transmitted in the telemetry link from the airplane 22 of FIG. 1 to the antenna 24 and coupled to the input ports, namely terminals A and B, of the comparator 28 can be extracted from the sum channel, at terminal C, free of phase shifts of the phase shifters 58 and 60. The effect of changing values of $\theta$ will be described subsequently with reference to FIG. 5.

Figure 4:
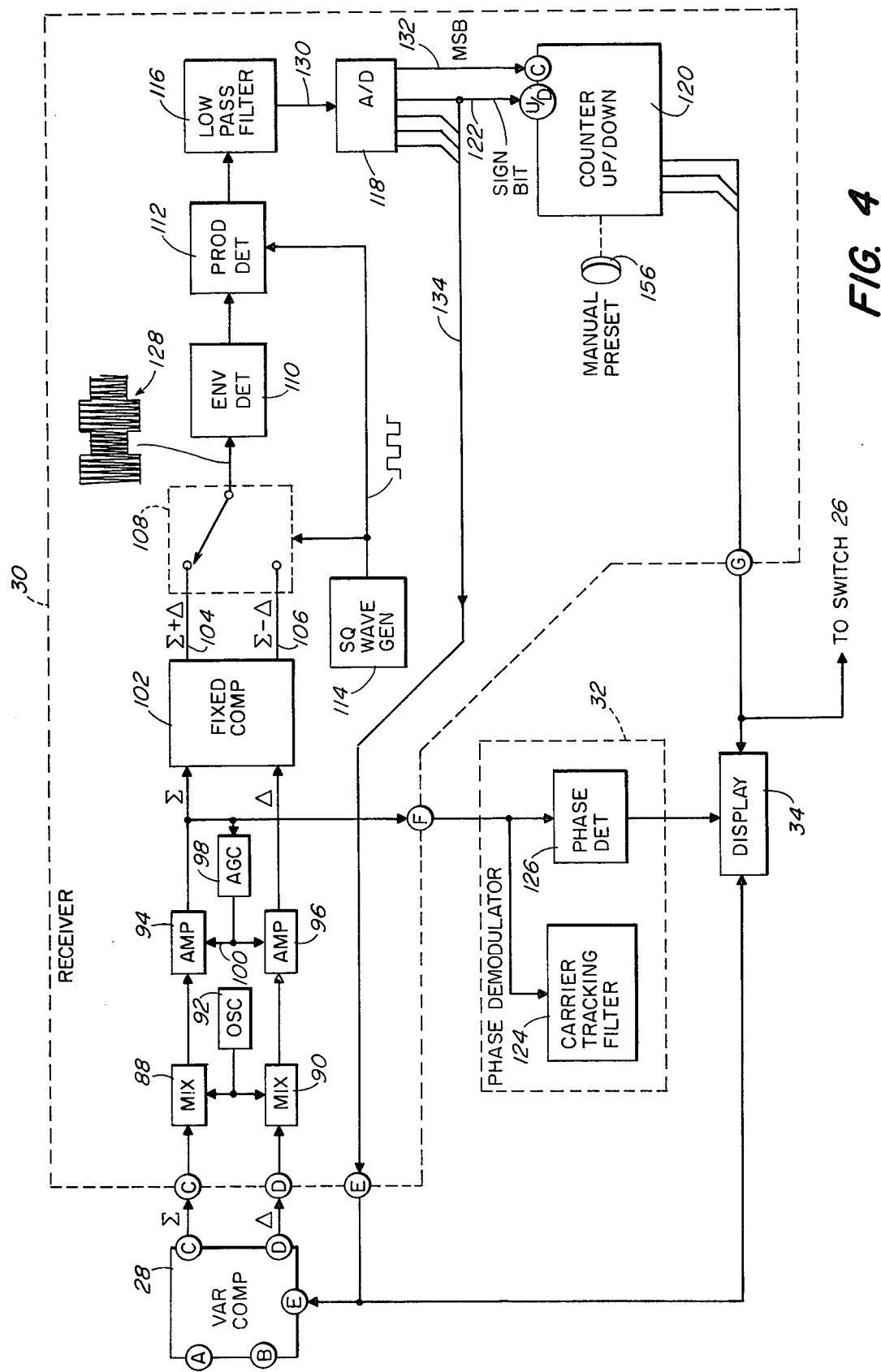
FIG. 4 is a block diagram of a receiver of FIG. 1, which, in accordance with the invention, includes circuitry for sensing the orientation of the source of radiant energy of FIG. 1 relative to the antenna of FIG. 1.

Referring now to FIG. 4, there is seen a block diagram of the receiver 30 and its interconnections with the comparator 28, the demodulator 32 and the display 34. The receiver 30 comprises two mixers 88 and 90 with a reference signal applied thereto by an oscillator 92, two amplifiers 94 and 96 with an automatic gain control 98 providing a gain control signal to the amplifiers 94 and 96 via line 100 in response to the output voltage of the amplifier 94, a comparator 102 having output signals on lines 104 and 106 which are alternately coupled by a switch 108 to an envelope detector 110, a product detector 112, a square wave generator 114 coupled to both the switch 108 and the detector 112, a low-pass filter 116, an analog-to-digital converter referred to hereinafter as A/D 118, and a counter 120 which counts up or down in accordance with a signal on line 122. The phase demodulator 32 is seen to comprise a carrier tracking filter 124 coupled to a phase detector 126.

The mixer 88 translates the sum signal at terminal C from a microwave frequency to an intermediate frequency, the intermediate frequency being equal to the difference between the frequency of the signal provided by the oscillator 92 and the frequency of the microwave signal at terminal C. Similarly, the mixer 90 translates the difference signal at terminal D from the microwave frequency to the intermediate frequency. The amplifiers 94 and 96 include filters having pass bands centered at the intermediate frequency and amplify the sum and difference signals of terminals C and D to a level suitable for the subsequent signal processing. The magnitude of the signals at the outputs of the amplifiers 94 and 96 are maintained substantially invariant with variations in the magnitude of the signals at the input terminals of the amplifiers 94 and 96 by means of the automatic gain control circuit 98. The output signals of the amplifiers 94 and 96 are coupled to the comparator 102. The output signal of the amplifier 94 is also coupled via terminal F to the demodulator 32.

The comparator 102, the switch 108, the detectors 110 and 112, and the filter 116 are utilized in providing an angle tracking error signal representing the position of the airplane 22 of FIG. 1 relative to the axis or center line between two adjacent beams such as the beams 46B and 46C. The comparator 102 operates in a manner similar to that of the comparator 28, except that the comparator 102 provides a fixed phase shift of 90° between the upper side arms of the two hybrid couplers. Accordingly, the comparator comprises a pair of 90° hybrid coupling circuits interconnected by a fixed phase shifter, they being functionally equivalent to the couplers 54 and 56 and phase shifter 59 of FIG. 2 but operating at the intermediate frequency. The output of the comparator 102 on line 104 is a signal equal to the sum of the sum and difference signals while the output of the comparator 102 on line 106 is equal to the difference of the sum and difference signals.

The square wave generator 114 applies a square wave to the switch 108 to alternately couple the lines 104 and 106 to the envelope detector 110. Thus, when the square waveform is of a positive value, the line 104 is coupled to the detector 110 while, when the square waveform is of a negative value, the line 106 is coupled to the detector 110. The resultant signal at the input to the detector 110 is shown graphically in the graph 128. By way of example, the graph 128 portrays the situation wherein the airplane 22 is slightly to the right of the center line between the beams 46B and 46C of FIG. 1 in which case the difference signal represented by $\Delta$ is relatively small compared to the magnitude of the sum signal represented by $\Sigma$ but cophasal therewith. The graph 128 shows a sinusoid of two amplitude states, a larger amplitude and a smaller amplitude, which alternate in step with the amplitude of the square wave of the generator 114. The positive portion of the square wave of the generator 114, in this example, corresponds to the larger amplitude portrayed in the graph 128 while the negative portion of the square wave corresponds to the smaller amplitude portrayed in the graph 128. The detector 110 detects the square wave pulsation in the amplitude of the signal portrayed in the graph 128 and applies this square wave signal to one input terminal of the detector 112 while the reference square wave from the generator 114 is applied to a second input terminal of the detector 112. The detector 112, being a product detector, multiplies the two input waveforms together to give a pulsating output waveform which is positive when the sum and difference signals are cophasal, the output of the detector 112 being negative when the sum and difference signals are of opposite phase. The pulsations in the output signal of the detector 112 are filtered by the low-pass filter 16 to provide a signal on line 130 which varies slowly in amplitude and sign in accordance with the position of the airplane 22 relative to the beams of the antenna 24 of FIG. 1.

The analog signal on line 130 is converted by the A/D 118 into a digital signal appearing on the output lines of the A/D 118. The most significant bit of the digital signal appears on line 132, while the other output lines containing the other digits of the digital number are shown fanning into line 134. One of the digits included in line 134 is a sign bit which is also coupled via line 122 to the counter 120. The sign bit on line 122 indicates whether the amplitude of the signal on line 130 is positive or negative. The signal on line 134 is coupled via terminal E to the comparator 128 for adjusting the phase of the phase shifters 58 and 60 to null out the difference signal at terminal D of the comparator 28.

As will be explained hereinafter with reference to FIG. 5, the signal on line 134 in cooperation with the phase shifters 58 and 60 of FIG. 2 provide only a limited range of capability for nulling out the angle error signal representing the position of the airplane 22 relative to the beam pattern of the antenna 24 of FIG. 1. When the maximum correction capability is obtained, the switch 26 of FIG. 1, as was mentioned hereinabove, switches the receiving beams so that the sum and difference signals at terminals C and D are in accordance with the position of the airplane 22 relative to another pair of beams such as the beams 46C and 46D. The switch 26 is operated by the signal at terminal G of the receiver 30, this signal being the output lines of the counter 120. The counter 120 counts the occurrences of the most significant bit on line 132 and counts UP when the sign bit on line 122 applies a logic level of 1 to the UP/DOWN terminal of the counter 120, the counter 120 counting DOWN when the signal on line 122 has a logic level of 0. It is noted that the most significant bit on line 132 occurs only after all the digits, other than the sign bit, on line 134 have attained their logic states of 1, the digital number 111 representing the aforementioned 91° phase shift of the phase shifter 60 of FIG. 2. Thus, when the airplane 22 flies past the center line of one of the beams 46A-E of FIG. 1, the counter 120 counts one count UP or DOWN corresponding to movement of the airplane 22 towards the right or towards the left, the resulting count of the counter 120 appearing at terminal G to alter the position of the arms 52 of the switch 26 to couple the next pair of receiving beams 46 to the comparator 28.

The phase-modulated communication by the airplane 22, referred to hereinabove with reference to FIG. 1, appears on the sum channel at terminal C of the comparator 28, is preserved during the mixing operation of the mixer 88 in FIG. 4, and appears at the output of the amplifier 94. The filter 124 of the demodulator 32 has a bandwidth sufficiently small to exclude spectral lines of the phase modulation and is, accordingly, able to track the carrier of the sum signal coupled from the amplifier 94 via terminal F to the filter 124. The output of the filter 124 serves as a reference to the phase detector 126 which then demodulates the phase modulation to obtain the message communicated by the airplane 22 of FIG. 1. This message is then coupled to the display 34 to be displayed as described hereinabove with reference to FIG. 1. The digital numbers at terminals E and G, which represent respectively the position of the airplane 22 relative to a pair of beams 46, and the specific pair of beams being coupled by the switch 26, are fed to the display 34 to show the position of the airplane 22 relative to the antenna 24.

Figure 5:
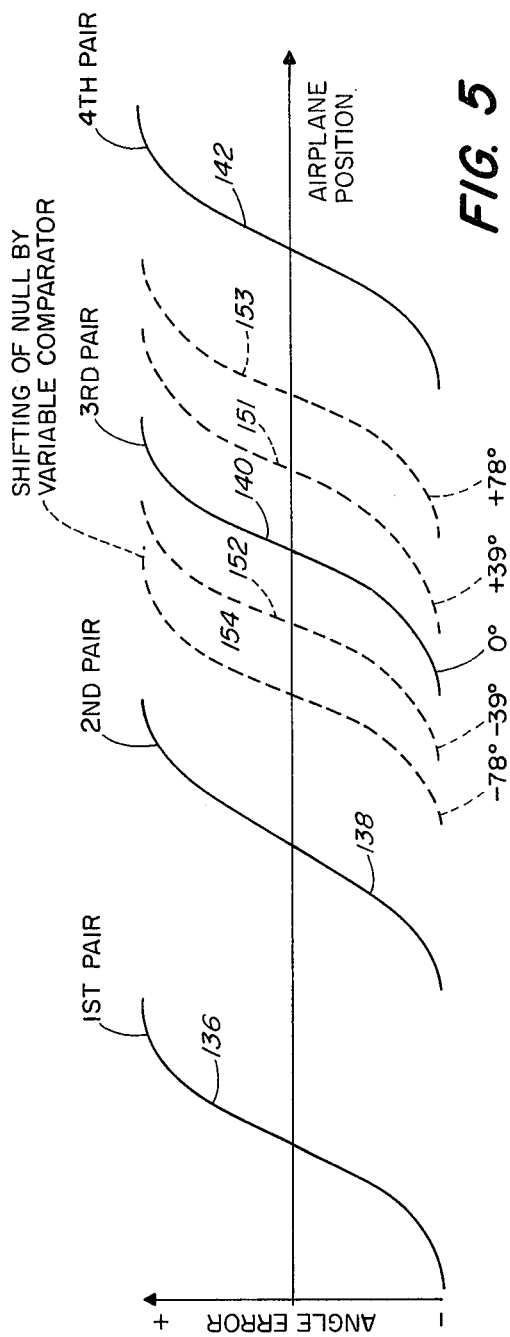
FIG. 5 is a graph of a set of angle tracking error curves corresponding to a plurality of pairs of beams of the antenna of FIG. 1 with the repositioning of the curves being accomplished by the variable comparator of FIG. 1.

Referring now to FIG. 5, there is seen a graph portraying a sequence of curves each of which represents a monopulse radar angle tracking error curve. The horizontal axis represents the position of the airplane 22 relative to a center line of the antenna 24 while the vertical axis represents the angle error provided by the difference signal at terminal D of FIG. 1. Curve 136 represents the angle error signal as seen by a coupling of the beams 46A and 46B by the switch 26 to the comparator 28 in the case where the signal at terminal E orders a phase shift of zero degrees to the comparator 28. For the same condition of a zero phase shift command at terminal E, the curve 138 represents the angle error as seen by the pair of beams 46B and 46C, the curve 140 represents the angle error as seen by the pair of beams 46C and 46D, and the curve 142 represents the angle error as seen by the pair of beams 46D and 46E. The four dashed curves 151–154 surrounding the curve 140 represent the angle error of the third pair of beams, namely the pair of beams 46C and 46D, under conditions where the phase command at terminal E is respectively +39°, −39°, +78° and −78°. Thus, it is seen that the effect of altering the phase shift of the phase shifters 58 and 60 of FIG. 2 is to shift the curve 140 to the right or to the left corresponding to the positions of the curves 151–154. A feature of the invention is made evident by the curves of FIG. 5, this being the capability for shifting the position of the angle error curve so that the relatively steep slope in the vicinity of the null of the error, where the curve crosses the horizontal axis, is always available for angle tracking and identification of the position of the airplane 22. It is noted, that with a single curve such as the curve 140, the slope of the curve gradually drops off towards zero as the airplane 22 shifts position either to the right or to the left of the null position. As is well known from monopulse radar theory, the slope of the angle error curve is a limitation on the available sensitivity of the radar tracking equipment in determining the position of the airplane 22 relative to the antenna 24. In view of the capability of the comparator 28 to shift the position of the curve 140, a maximum tracking sensitivity is maintained by virtue of the maximum slope in the location of the null of the curve. Accordingly, the disclosed system is capable of greatly increased precision in the tracking of the airplane 22 and in the displaying of its position on the display 34.

Summarizing the operation, therefore, a telemetering link is established between the airplane 22 and the antenna 24 of FIG. 1 by manually presetting the counter 120 of FIG. 4 by a knob 156 so that the digital number appearing at terminal G operates the switch 26 of FIG. 1 to select the two left-hand beams 46A and 46B in the event that the airplane is traveling from the left, or to select the two right-hand beams 46D and 46E in the event that the airplane 22 is traveling from the right. The antenna 24, being a Rotman lens, focuses the selected beams upon their corresponding horns 44 from which energy in the beams is directed to terminals A and B of the comparator 28. The sum and difference signals at terminals C and D are coupled to the receiver 30 which extracts therefrom a tracking error signal representing the position of the airplane 22 relative to a center line of the selected pair of beams 46. The tracking error signal from terminal E of the receiver 30 is applied to the variable comparator 28 which varies the phase shift between couplers 54 and 56 of FIG. 2 to reposition an angle error curve shown in FIG. 5, thereby to maintain tracking of the airplane 22 near the null of an angle error curve such as curve 140, of FIG. 5. A phase modulation transmitted on the carrier from the airplane 22 to the antenna 24 is preserved by the comparator 28 by virtue of the complementary positive and negative phase shifts introduced by the phase shifters 58 and 60 of FIG. 2. Thus, the phase modulation can be coupled via the sum channel at terminal C through the receiver 30 to the phase demodulator, as seen in FIGS. 1 and 4, to recover the message transmitted from the airplane 22. The communicated message is coupled from the demodulator 32 to the display 34. Also, the selection of the pair of beams 46 is communicated via terminal G to the display 34, and the error signal of terminal E representing the position of the airplane 22 relative to a pair of beams 46 is coupled to the display 34 for indicating the position of the airplane 22 during the communication of its message.

The disclosed system provides tracking of the airplane 22 of FIG. 1 in one plane, the azimuthal plane. To provide tracking data also in the elevation plane, a pair of antennas 24 may be mounted side by side to form a two dimensional array with sum and difference signals extracted as taught by M. I. Skolnik in *Radar Handbook*, section 11.7, FIG. 39, published by McGraw-Hill Book Company in 1970. The hybrid "magic T" couplers of Skolnik in combination with the variable phase shifters disclosed herein at FIG. 2 provides for tracking of the airplane 22 in two planes.

It is understood that the above-described embodiment of the invention is illustrative only and that modifications thereof may occur to those skilled in the art. Accordingly, it is desired that this invention is not to be limited to the embodiment disclosed herein but is to be limited only as defined by the appended claims.

What is claimed is:

1. A tracking system comprising:
   comparator means having first and second hybrid couplers and first and second phase shifters, the phase shift of said first phase shifter occurring in increments which are of equal magnitude to and of opposite sign to increments in the phase shift of said second phase shifter, said first phase shifter being connected between one output port of said first coupler and one input port of said second coupler, said second phase shifter being connected between a second output port of said first coupler and a second input port of said second coupler, said first coupler having a plurality of input ports for coupling to an antenna system having a multiple beam radiation pattern;

means coupled to said second hybrid coupler for sensing a direction relative to said radiation pattern of radiant energy incident upon said antenna, said sensing means providing signals to said first phase shifter and said second phase shifter for controlling the magnitudes of said shifts whereby a null between two beams of said radiation is positioned along the direction of said incident radiant energy;

a switch for sequentially coupling said first hybrid coupler to pairs of beam output signals of said antenna system; and wherein said sensing means further provides a first signal indicating that the magnitude of one of said shifts is greater than a predetermined amount, and a second signal indicating a sign of said first signal, said sensing means further comprising a counter responsive to said second signal for counting occurrences of said first signal, a count of said counter being coupled to said switch for operating said switch to a different position thereof corresponding to said count.

2. A system according to claim 1 further comprising an antenna system having a multiple beam radiation pattern, said antenna system being coupled to said first coupler.

3. A system according to claim 2 further comprising switching means coupled between said antenna system and said first coupler for selectively switching a plurality of beams of said multiple beam radiation pattern to said first coupler.

4. A system according to claim 3 wherein said sensing means is coupled to said switching means for operating said switching means in accordance with a direction of said incident radiant energy relative to said radiation pattern.

5. A system according to claim 1 wherein said first coupler includes a crossarm coupled between two side arms, said coupling of said crossarm to said side arms introducing a 90° phase shift between energy propagating through said crossarm and energy propagating through one of said side arms.

6. A system according to claim 5 wherein said coupling of said crossarm to said side arms provides for a coupling of one-half of radiant energy into said crossarm and one-half of said radiant energy into said side arm.

7. A system according to claim 6 further comprising means responsive to radiant energy passing through said comparator means for demodulating a phase modulation of said radiant energy, said first phase shifter and said second phase shifter permitting passage of said phase modulation through said comparator means free of phase shifts introduced by said phase shifters to radiant energy propagating through said comparator means.

8. In combination:

an antenna providing a plurality of receiving beams simultaneously;

switching means coupled to the antenna for selecting a pair of said beams;

comparator means coupled to said switching means and responsive to said selected pair of beams for developing output signals representing the direction of a source of radiant energy incident upon said antenna, said comparator means having a plurality of hybrid coupler means interconnected by phase shifting means;

means responsive to said comparator output signals for varying a phase of said phase shifting means; and wherein said comparator means includes means for providing a first signal indicating that one of said output signals has exceeded a predetermined magnitude, and a second signal indicating the sign of said magnitude, said comparator further comprising counting means responsive to said second signal for counting occurrences of said first signal, a count of said counter being coupled to said switching means for operating said switching means for selecting a pair of said beams.

* * * * *